US010204298B2

(12) United States Patent
Hungate et al.

(10) Patent No.: US 10,204,298 B2
(45) Date of Patent: Feb. 12, 2019

(54) UHF RFID TAG FOR MARKING UNDERGROUND ASSETS AND LOCATIONS AND METHOD OF USING SAME

(71) Applicant: Berntsen International, Inc., Madison, WI (US)

(72) Inventors: Steven Hungate, Redondo Beach, CA (US); William C. Rushing, Waunakee, WI (US); Michael Klonsinski, Oregon, WI (US)

(73) Assignee: Berntsen International, Madison, WI (US)

( * ) Notice: Subject to any disclaimer, the term of this patent is extended or adjusted under 35 U.S.C. 154(b) by 0 days.

(21) Appl. No.: 15/605,153

(22) Filed: May 25, 2017

(65) Prior Publication Data
US 2018/0005103 A1 Jan. 4, 2018

Related U.S. Application Data

(60) Provisional application No. 62/342,274, filed on May 27, 2016.

(51) Int. Cl.
*G06K 19/06* (2006.01)
*G06K 19/077* (2006.01)
(Continued)

(52) U.S. Cl.
CPC ......... *G06K 19/07786* (2013.01); *G06K 7/10* (2013.01); *G06K 17/00* (2013.01);
(Continued)

(58) Field of Classification Search
CPC ............ H01Q 1/38; H01Q 1/36; H01Q 1/243; H01Q 9/42; H01Q 1/22; H01Q 1/2225; H01Q 1/241; H01Q 3/01; H01Q 3/44; H01Q 5/25; H01Q 9/27; G06K 19/07749; G06K 19/0723; G06K 19/077; G06K 19/07773
(Continued)

(56) References Cited

U.S. PATENT DOCUMENTS 3,517,316 A    6/1970   Hatcher et al.
3,665,511 A    5/1972   Wolf
(Continued)

OTHER PUBLICATIONS

"3M Dynatel Locating and Marking, Electronic Marker System," 3M Innovation, Track and Trace Solutions, 2008.
(Continued)

*Primary Examiner* — Thien M Le
(74) *Attorney, Agent, or Firm* — Boyle Fredrickson, S.C.

(57) ABSTRACT

A marker for locating and identify assets which includes an ultra-high frequency (UHF) radio frequency identification (RFID) tag optimized for use below ground and able to more effectively communicate with a RFID reader through a lossy medium such as soil and air. The markers include a reflector which is sized relatively larger than the tag to help focus the forward pattern of the tag more tightly in a forward direction normal to the spiral surface. In addition, the tag includes a chip configured for the soil in which it is to be buried, and an antenna polarized to match the polarization of an RFID reader antenna that is part of a system that includes the marker and reader.

12 Claims, 15 Drawing Sheets

(51) Int. Cl.
*G06K 7/10* (2006.01)
*G06K 17/00* (2006.01)
*G06K 19/07* (2006.01)

(52) U.S. Cl.
CPC ....... *G06K 19/077* (2013.01); *G06K 19/0723* (2013.01); *G06K 19/07783* (2013.01); *G06K 19/07784* (2013.01)

(58) Field of Classification Search
USPC ........................................................ 235/492
See application file for complete search history.

(56) References Cited

U.S. PATENT DOCUMENTS

| | | | |
|---|---|---|---|
| 3,836,842 A | 9/1974 | Zimmermann et al. | |
| 4,441,288 A | 4/1984 | Feldman et al. | |
| 4,811,030 A | 3/1989 | Pedersen et al. | |
| 5,148,641 A | 9/1992 | Rushing et al. | |
| 5,689,238 A | 11/1997 | Cannon et al. | |
| 5,739,785 A | 4/1998 | Allison et al. | |
| 5,825,298 A | 10/1998 | Walter et al. | |
| 6,137,413 A | 10/2000 | Ryan et al. | |
| 6,377,176 B1 | 4/2002 | Lee et al. | |
| 6,407,715 B1* | 6/2002 | Chen | H01Q 1/38 343/700 MS |
| 6,414,642 B2* | 7/2002 | Honda | H01Q 1/243 343/702 |
| 6,939,290 B2 | 9/2005 | Iddan et al. | |
| 6,958,034 B2 | 10/2005 | Iddan et al. | |
| 7,256,699 B2 | 8/2007 | Tethrake et al. | |
| 7,345,486 B2 | 3/2008 | Mercer et al. | |
| 7,609,165 B2 | 10/2009 | Sharma et al. | |
| 7,830,260 B2 | 11/2010 | Wang et al. | |
| 7,896,742 B2 | 3/2011 | Barney et al. | |
| 7,969,295 B2 | 6/2011 | Colvero et al. | |
| 7,973,661 B2 | 7/2011 | Copeland et al. | |
| 8,018,345 B2 | 9/2011 | Xiang et al. | |
| 8,162,821 B2 | 4/2012 | Kawano et al. | |
| 8,183,979 B2 | 5/2012 | Squibbs et al. | |
| 8,289,144 B2 | 10/2012 | Zhu et al. | |
| 8,289,167 B2 | 10/2012 | Bauchot et al. | |
| 8,350,702 B2 | 1/2013 | Copelan et al. | |
| 8,947,205 B2 | 2/2015 | Rushing et al. | |
| 2003/0020810 A1 | 1/2003 | Takizawa et al. | |
| 2004/0056823 A1 | 3/2004 | Zuk et al. | |
| 2004/0140900 A1 | 7/2004 | Barber et al. | |
| 2004/0250819 A1 | 12/2004 | Blair et al. | |
| 2005/0110627 A1* | 5/2005 | Sabet | B60C 23/0408 340/447 |
| 2005/0221875 A1* | 10/2005 | Grossman | H01Q 1/242 455/575.7 |
| 2006/0124740 A1 | 6/2006 | Woodard et al. | |
| 2006/0220955 A1 | 10/2006 | Hamilton et al. | |
| 2007/0120690 A1 | 5/2007 | Barber et al. | |
| 2007/0298846 A1* | 12/2007 | Greene | H02J 17/00 455/572 |
| 2008/0055094 A1 | 3/2008 | Barber et al. | |
| 2008/0262885 A1 | 10/2008 | Jain et al. | |
| 2008/0303633 A1 | 12/2008 | Cheng et al. | |
| 2009/0140852 A1 | 6/2009 | Stolarczyk et al. | |
| 2009/0201154 A1 | 8/2009 | Bauchot et al. | |
| 2010/0103053 A1 | 4/2010 | Nikitin et al. | |
| 2013/0015243 A1* | 1/2013 | Garber | D06F 58/203 235/385 |
| 2013/0036821 A1* | 2/2013 | Belkerdid | G01N 29/041 73/627 |
| 2014/0055245 A1 | 2/2014 | Hansen et al. | |
| 2014/0152507 A1* | 6/2014 | McAllister | G06K 7/10376 342/126 |
| 2014/0319225 A1 | 10/2014 | Van Rens et al. | |
| 2015/0379391 A1 | 12/2015 | Pantaloni | |
| 2017/0317418 A1* | 11/2017 | Garcia | H01Q 9/0407 |

OTHER PUBLICATIONS

"3M ScotchMark Locating and Marking Products," 3M innovation, Corrosion Protection Department, 1999.
International Search Report and Written Opinion of the International Searching Authority, dated Jul. 18, 2017, for International Appln. No. PCT/US2017/034462 filed May 25, 2017.
International Search Report and Written Opinion of the International Searching Authority, dated Jul. 20, 2010, for International Appln. No. PCT/US2010/035768 filed May 21, 2010.
Rushing, Bill , "For a Smart Environment, Smart Survey Monuments," ACSM Bulletin, Feb. 2010.

* cited by examiner

UHF RFID TAG FOR MARKING UNDERGROUND ASSETS AND LOCATIONS AND METHOD OF USING SAME

CROSS-REFERENCE TO RELATED APPLICATIONS

This application claims priority to U.S. Provisional Application Ser. No. 62/342,274, filed May 27, 2016, the entirety of which is hereby incorporated herein by reference.

FIELD

The present disclosure relates to the field of asset location and marking. The present disclosure more specifically relates to the field of ultra-high frequency (UHF) radio frequency identification (RFID) tags for marking underground assets and locations, RFID readers for use with same, and methods of using such tags and readers.

BACKGROUND

Underground infrastructure and asset location includes and is the process of locating, identifying, and labeling assets which are buried below the earth's surface at varying depths. These assets may include survey markers, communication lines, power distribution, natural gas, cable television, fiber optics, storm drains, water mains, and wastewater pipes, etc. These systems are often run underground; some by the very nature of their function, others for convenience or aesthetics.

Before digging, local governments often require that the underground system's locations be denoted and approved (e.g., if it is to be in a public right-of-way). Also, owners commonly require location and identification of assets to facilitate management and maintenance. Because of the many different types of materials that go into manufacturing each of the different types of underground assets, different detection and location methods are typically used. For metal pipes and cables, magnetic locators or electromagnetic equipment consisting of a transmitter and a receiver are often utilized. For other types of pipe, such as those made of plastic or concrete, other types of radio or ultrasonic location systems are commonly required. Location by these technical means is often necessary because maps of subsurface assets tend to lack the pinpoint accuracy and/or precision needed to ensure proper clearance or facilitate maintenance or repair. This is especially an issue in older or remote areas, any maps of which may be dated and/or inaccurate, or may be missing entirely. In limited cases, a few utilities and assets are "permanently" marked with short exposed posts which are vulnerable to damage or accidental removal.

Radio frequency identification (RFID) tags are well-known and typically include an integrated circuit that is operatively coupled to an antenna. The integrated circuit typically includes some amount of memory in which a tag identifier is stored, with possibly other information related to the tag and/or the item(s) with which the tag is associated. When an RFID reader or interrogator transmits energy via its reader antenna to interrogate the RFID tag, the tag responds with information from which the reader can obtain the RFID tag identifier and any other information. The identifier and other information may be utilized to determine characteristics of the RFID-tagged items(s). The tag may also have a battery, or it may have no battery and be powered by a capacitor using energy from an external reader.

RFID tags typically operate in low frequency (less than 100 MHz) or high frequency (more than 100 MHz) modes. High frequency tags can have their data read at greater distances that lower frequency tags. Ultra-high frequency (UHF) tags are a subset of high frequency tags and operate in a range of higher frequencies between 300 MHz and 3 GHz (3000 MHz), also known as the decimeter band or decimeter wave as the wavelengths of UHF waves range from one to ten decimeters (10 cm to 1 meter).

Ultra-high frequency (UHF) radio frequency identification (RFID) is a proven technology that has been used been used extensively above ground as a logical replacement to the aging barcode system. UHF RFID has taken over identification of much of the retail product market and is used for tracking location and status of product in all phases of manufacture and sales. This explosive adoption has been possible due to technological advances resulting in low hardware cost relative to the exceptional improvement in inventory control and tracking.

In a typical UHF RFID system, a reader and tag communicate using variations in amplitude of reflected signals called "backscatter modulation" or backscatter communication. With backscatter communication, the radio frequency wave must propagate both from the reader to the tag (Forward Link) where it is used to energize the tag, and then a portion is reflected back from the tag to the reader (Reverse Link). Backscatter communication results in a reduction in the power density (strength) of an electromagnetic wave as the wave propagates through space. This is called path loss. Path loss may be due to many effects, such as free-space loss, refraction, diffraction, reflection, and absorption. Path loss is largely influenced by environment, propagation medium, the distance between the transmitter and the receiver, and the relative location of the antennas.

These losses affect both the signal transmitted from the reader to the tag (Forward Link) and the backscattered return signal from the tag to the reader (Reverse Link) and limit read range such that tags buried in depths may be subject to interference that renders them unreliable.

As such, UHF RFID tags are not typically used below ground. Radiated UHF RF waves do not penetrate soil, earth, or water well, and the higher frequencies are attenuated and inhibited more such that transmission of such waves through the earth has been generally impracticable. In the case of reading tags buried in the soil, the soil properties and moisture content play a significant role in signal attenuation and maximum read depth.

Because they are not typically used below ground, conventional UHF RFID tags are adapted or configured to communicate in air. Such tags typically use and include a patch antenna because it is simple to fabricate, easy to implement, low profile and compact, and light weight. Such tags work well for typical above-ground tracking and location uses such as logistics and supply chain management, item level inventory tracking, race timing, attendee tracking, materials management, access control, IT assets tracking, tool tracking, library materials tracking, etc.

Such known UHF RFID tags with patch antennas may be sensitive to interference and, depending upon several soil parameters including permittivity, permeability, and resistivity, may have limited read range potential when buried below the Earth's surface or provided in or around other various lossy mediums (e.g., underwater, concrete walls, wood beams, etc.). This is especially true of known passive UHF RFID tags. The UHF RF signal is attenuated by both soil surface reflection loss and adsorption loss due to the soil properties and electrolyte content.

SUMMARY

There is a need for UHF RFID tag, marker, or the like of a type disclosed in the present application that can communicate (read/write/respond) at greater distances from an RFID reader, and/or has an improved read range through a lossy medium such as soil;

There is also a need for a UHF RFID tag, marker, or the like of a type disclosed in the present application that has a cross polarized or circularly polarized tag adapted to transmit UHF RIFD through air and/or a lossy medium such as soil;

There is also a need for a UHF RFID tag, marker, or the like of a type disclosed in the present application that includes a more efficient antenna design than that of a patch antenna;

There is also a need for a UHF RFID tag, marker, or the like of a type disclosed in the present application that works as well or better in lossy mediums than in air;

There is also a need for a UHF RFID tag, marker, or the like of a type disclosed in the present application that helps focus (e.g., by using a reflector) an otherwise omnidirectional tag in a more specific or limited direction (e.g., to increase gain in that direction);

There is also a need for a UHF RFID tag, marker, or the like of a type disclosed in the present application the performance of which is not strongly affected by the presence of magnets and magnetic fields, or metallic objects;

There is also a need for a UHF RFID tag, marker, or the like of a type disclosed in the present application having an antenna or antenna type that may be fine-tuned to be better adapted to specific soil conditions surrounding the tag;

There is also a need for a UHF RFID tag, marker, or the like of a type disclosed in the present application having an antenna or antenna type that may be self-tuning;

There is also a need for a UHF RFID tag, marker, or the like of a type disclosed in the present application that can be circularly polarized to "match" the polarization of an RFID reader (e.g., right hand or left hand polarization) to provide advantages such as better performance; and There is also a need for a tag that is relatively inexpensive to manufacture but provides a high gain.

Accordingly, an improved UHF RFID tag, marker, and antenna and method of using same are provided.

In various examples of embodiments disclosed herein, the tags and markers have been optimized and/or designed to include unique high gain antennas with a focused radiation pattern. UHF RFID makes use of unlicensed bands; for example in the North America, maximum allowed EIRP (Equivalent Isotropic Radiated Power) is four Watts. Most local telecom authorities control the radiated energy to minimize interference with other wireless devices that share the same band or with wireless devices that share adjacent frequencies. RFID readers typically transmit with a power of thirty dBm and are limited by the Federal Communications Commission (FCC) to have EIRP of no greater than thirty-six dBm. This means that the reader antenna can have no greater than a six dB gain. This also suggests that, for a maximum allowed radiated power, the read distance is inversely proportionate to the path loss. There is no limit on tag antenna gain however and high gain commercial RFID tags can have gains of much more than six dB.

In various embodiments, disclosed herein are various high gain UHF RFID tags and markers that are optimized for a soil or lossy medium, or air. Polarization, losses, mismatch losses, and/or pattern focus have all been addressed in the various embodiments of the disclosed integrated reader-tag matched system. The various embodiments of low loss high gain designs disclosed herein result in exceptional read depths up to sixty percent greater in a lossy soil environment than known tags. The tags disclosed herein are unique designs and are all highly directional and typically exhibit between six dB and ten dB gain.

Accordingly an apparatus for locating assets is provided, the apparatus comprising: a housing having a top and a bottom; an ultra-high frequency radio frequency identification tag provided in the housing, the tag having a rear side facing the bottom of the housing and a front side facing the top of the housing, the front side having a chip and a dual spiral antenna provided thereon; a reflector provided in the housing between the rear side of the tag and the bottom of the housing; and a permanent magnet provided in the housing between the rear side of the tag and the bottom of the housing; wherein the antenna has an antenna outside dimension; and wherein the reflector has a reflector outside dimension greater than the antenna outside dimension.

Accordingly an apparatus for locating assets is provided, the apparatus comprising: a housing having a top and a bottom; an ultra-high frequency radio frequency identification tag provided in the housing, the tag having a rear side facing the bottom of the housing and a front side facing the top of the housing, the front side having a chip and a Yagi antenna provided thereon; a reflector provided in the housing between the rear side of the tag and the bottom of the housing; and a permanent magnet provided in the housing between the rear side of the tag and the bottom of the housing; wherein the antenna has an antenna outside dimension; and wherein the reflector has a reflector outside dimension greater than the antenna outside dimension.

Accordingly an apparatus for locating assets is provided, the apparatus comprising: a housing having a top and a bottom; an ultra-high frequency radio frequency identification tag provided in the housing, the tag having a rear side facing the bottom of the housing and a front side facing the top of the housing, the front side having a chip and a backfire helix antenna provided thereon; a reflector provided in the housing between the rear side of the tag and the bottom of the housing; and a permanent magnet provided in the housing between the rear side of the tag and the bottom of the housing; wherein the antenna has an antenna outside dimension; and wherein the reflector has a reflector outside dimension greater than the antenna outside dimension.

BRIEF DESCRIPTION OF DRAWINGS

Various examples of embodiments of the systems, devices, apparatus, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
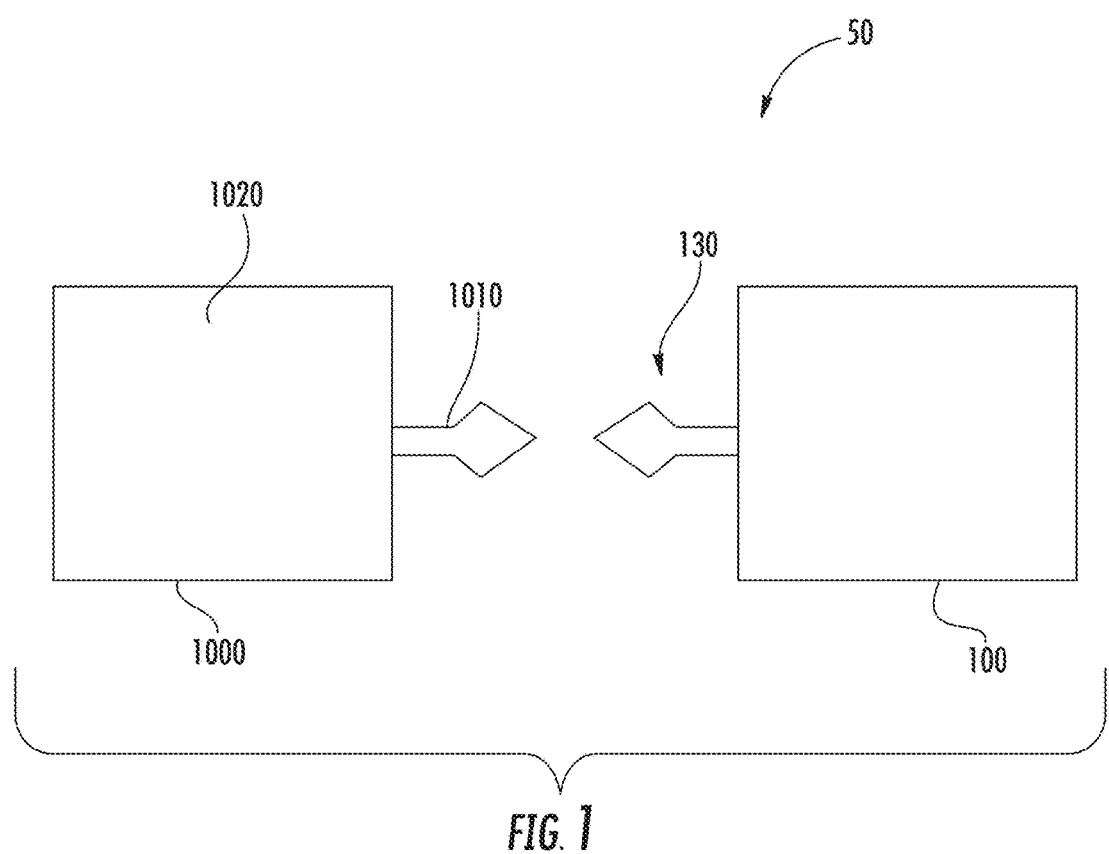
FIG. 1 illustrates a block diagram of an RFID system, according to various examples of embodiments.

Referring to FIG. 1, an example of an RFID system 50 is illustrated. In various embodiments, RFID system 50 includes a marker 100 and an RFID reader 1000. In various embodiments, RFID reader 1000 includes an antenna 1010 electrically connected to a transceiver 1020.

Figure 2:
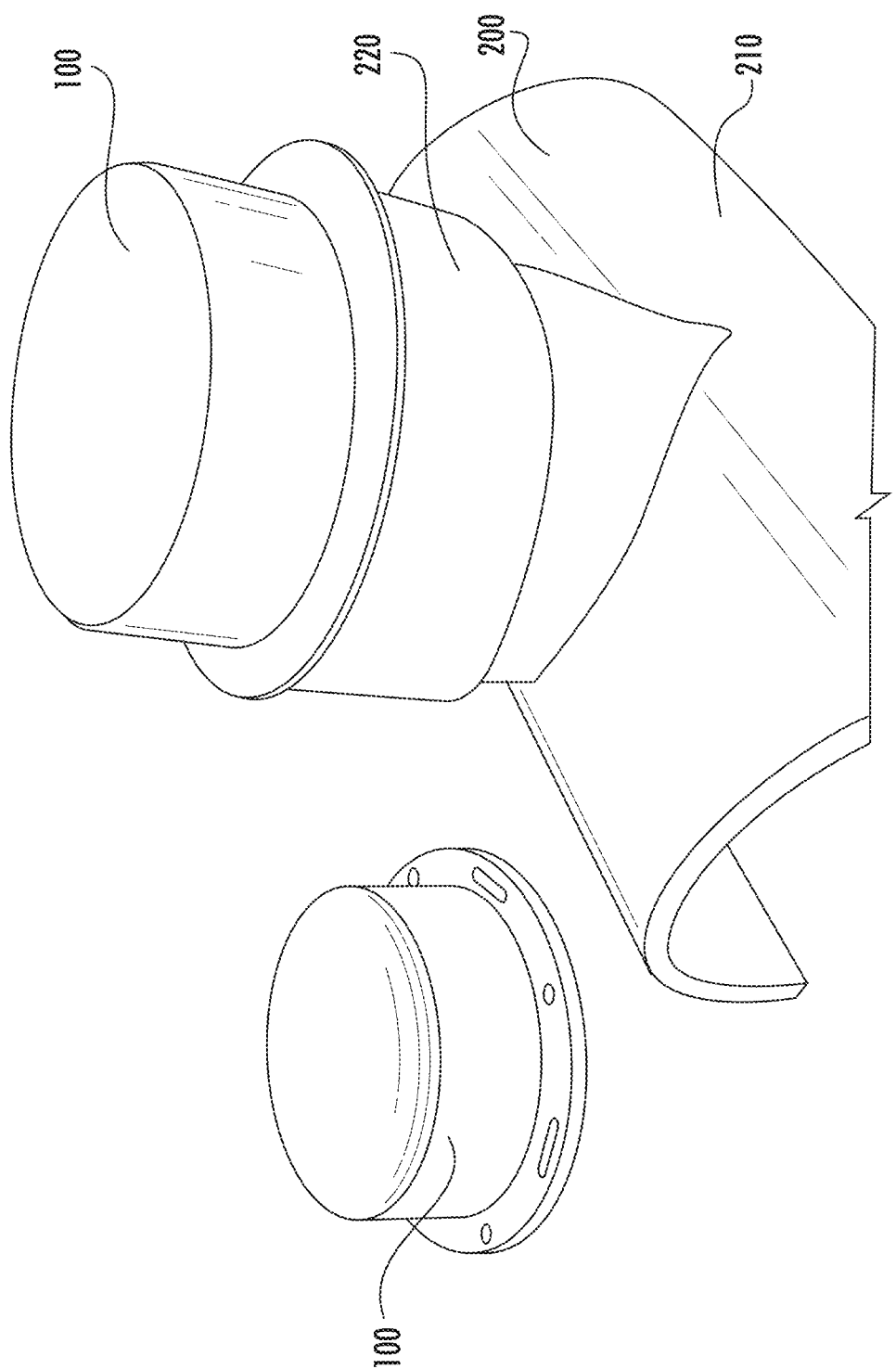
FIG. 2 illustrates a perspective view of a first embodiment of a marker and a marker retaining member, according to various examples of embodiments.
Figure 3:
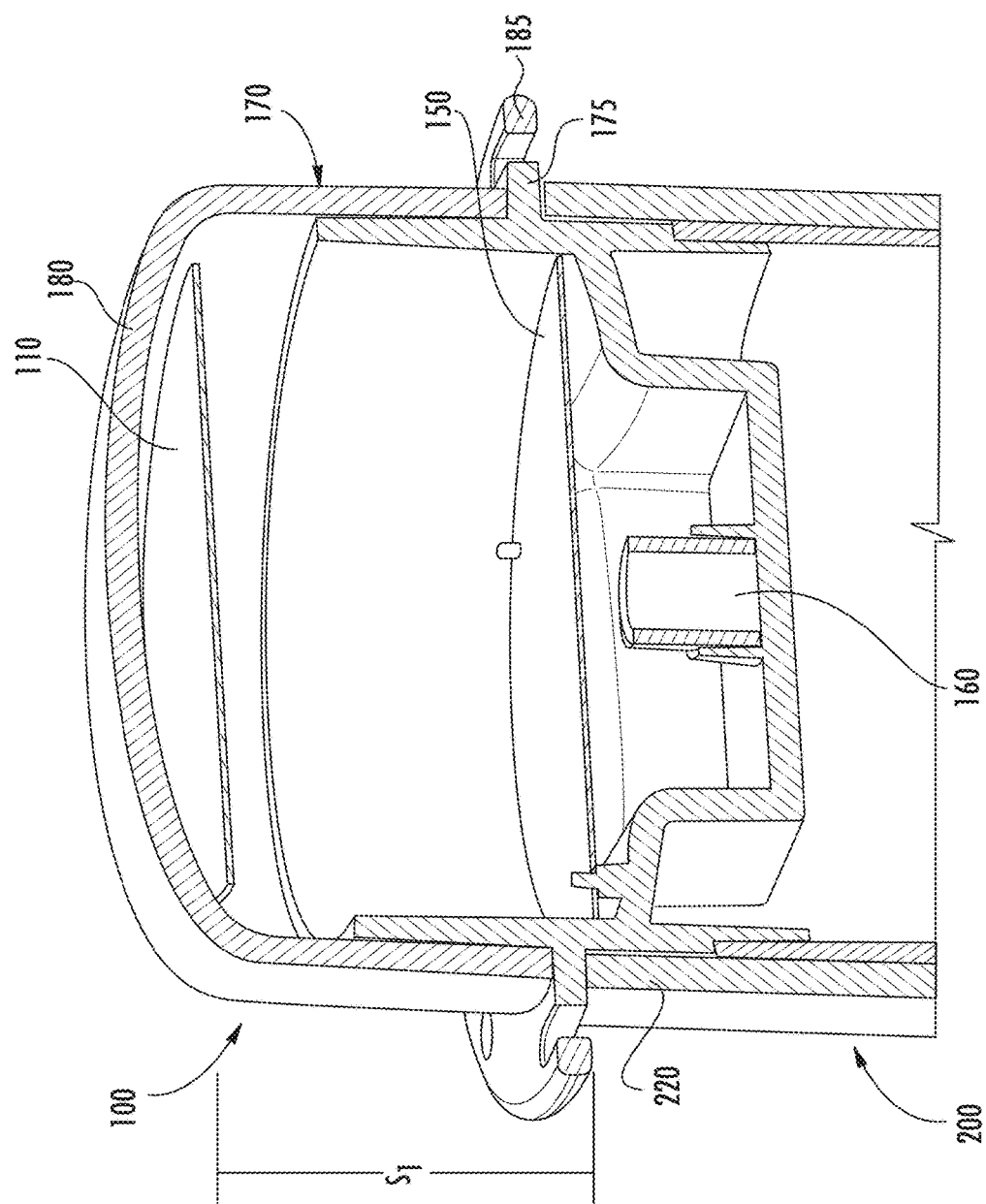
FIG. 3 illustrates a partial cross sectional view of the marker and retaining member of FIG. 2.

Referring to FIG. 2, example embodiments of marker 100 and marker 100 with marker retaining member 200 are illustrated. As illustrated, mark retaining member 200 includes a saddle member or semicircular or C-shaped member 210 adapted or configured to be provided around and/or coupled to the outside radius of a pipe or conduit (not shown), and a fitting or sleeve 220 coupled to the saddle member 210. As illustrated in FIGS. 2 and 3, in various embodiments, the fitting or sleeve is configured to retain marker 100 relative to retaining member 200 by at least partially fitting over or enclosing marker 100 and/or its housing.

Referring now to FIG. 3, additional details of an example embodiment of marker 100 with retaining member 200 are illustrated. Marker 100 includes an RFID tag 110 and a reflector 150. In various embodiments, RFID tag 110 is positioned over the reflector 150. In various embodiments, RFID tag 110 is provided in an upper part of marker 100 and reflector 150 is provided in a lower part of marker 100. In various embodiments, RFID tag 110 is provided in spaced relation to reflector 150 and, when in the Earth, between the Earth's surface and reflector 150. In various embodiments, marker 100 also includes a magnet 160. In various embodiments, reflector 150 is provided between RFID tag 100 and magnet 160.

In various embodiments, marker 100 includes a housing 170, and RFID tag 110 and reflector 150 are enclosed in housing 170. In various embodiments, housing 170 includes a lower enclosure 175 having an outside dimension (e.g., diameter) configured to fit within fitting 220 of retaining member 200, and an upper enclosure or cap 180 having an outside dimension (e.g., diameter) configured to fit over outside dimension (e.g., diameter) of lower enclosure 175. In various embodiments, upper enclosure 180 has a wall thickness of approximately one-quarter inch. Retaining member fitting 220 has an inner surface and may have a step 225 provided on the inner surface to help retain marker 100 provided in retaining member 220 relative to the retaining member 200. Housing 170 (e.g., lower enclosure 175) may also include a rim 185 sized larger than an interior or inside dimension of fitting 220 of retaining member 200 to help retain marker 100 relative to retaining member 200.

In various embodiments, housing 170 is made of plastic such as PVC. It should be appreciated, however, that the housing may be made of any number of materials or combinations of materials. In various embodiments, RFID tag 110 is housed in an approximately six-inch diameter by approximately four-inch tall cylinder (e.g., of commercial PVC pipe) housing 170.

Figure 4:
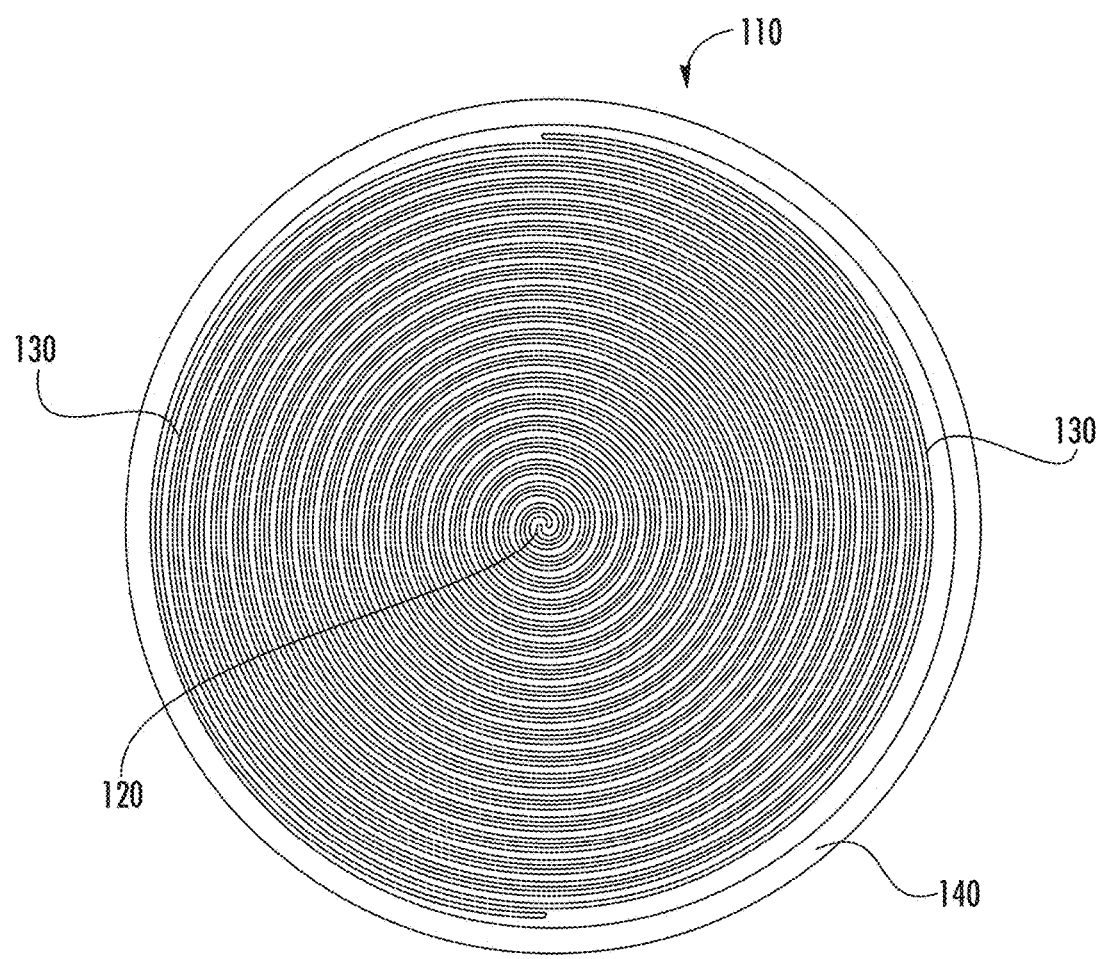
FIG. 4 illustrates a top view of a dual spiral, circularly polarized RFID tag, according to various examples of embodiments.

In various embodiments, RFID tag 110 is passive. It should be appreciated, however that the RFID tag may instead be an active tag. Referring now to FIG. 4, in various embodiments, RFID tag 110 includes an integrated circuit or chip 120 (such as a silicon chip) and an antenna 130, provided or mounted on or in a printed current board (PCB) 140. Silicon sensitivity is typically defined in pertinent part as the minimum received radio frequency power necessary to switch on an RFID tag. Silicon sensitivity is one of the more important tag limitations and can impact backscatter signal strength. The greater a tag's silicon chip sensitivity (smaller numerical value), the longer the read distance at which the tag can communicate with the reader.

There are two primary factors that affect the chip sensitivity value: (1) silicon fabrication process and (2) radio frequency front-end electronic design. In various embodiments, chip 120 of RFID tag 110 is a high sensitivity chip having a sensitivity range from −18 dBm to −21 dBm. In various embodiments, tag 110 includes a Higgs 3 RFID chip. It should be appreciated, however, that other know chips (such as a Impinj Monza R4 RFID chip, a RFMicron Magnus-S2 chip, a Quanray Qstar-2A chip, a Impinj Monza 4 chip, or a Impinj Monza R6 chip) or later developed chips having a different (e.g., improved, greater or otherwise optimized) sensitivity, may also be utilized. For example, a Qstar-2A may be a good chip to improve read range as it has relatively higher real impedance, while allows for higher antenna performance bandwidth. While the tags described in more detail herein include or incorporate passive RFID chips, it should be appreciated that active chips and sensor chips may also be incorporated, included or utilized.

In various embodiments, antenna 130 of RFID tag 110 is a dual spiral antenna. In various embodiments, antenna 130 is a four-inch to six-inch diameter dual spiral antenna. In various embodiments, antenna 130 is formed of a layer of conductive material deposited in a dual spiral pattern on printed circuit board 140. The antenna could also be formed from a wire shaped into a spiral pattern and coupled to the printed circuit board. The antenna may be implemented on FR-4 (or FR-1 or FR-2, e.g., for cost reduction) material. In various embodiments, tag 110 is approximately five inches in diameter. In various embodiments, antenna 130 is a four and three-quarter inch diameter dual spiral antenna. In various embodiments, antenna 130 is circularly polarized. In various embodiments, antenna 130 is right hand circularly polarized. In various examples of embodiments, antenna 130 is right hand circularly polarized to match a right hand polarization of a reader antenna. In such embodiments, the matching polarization of the tag and reader antenna help give the reader and tag system up to about a three dB gain or increase over systems without matching polarization.

In various embodiments, antenna 130 operates at a high frequency (e.g., a frequency in the range of 890 MHz and 940 MHz and, more particularly at a frequency of approximately 915 MHz). In various embodiments, tag 110 provides in excess of six dB gain and is not prone to detuning due to proximity of soil. In various embodiments, tag 110 provides in excess of ten dB gain and may provide additional read range through soil approximately one foot over a tag with a six dB gain.

In various embodiments, tag 110 includes an impedance matching circuit electrically connected to chip 120. The matching circuit may be integrated with chip 120. In various embodiments, the matching circuit is also electrically connected to antenna 130. In various embodiments, tag 110 is impedance matched for a lossy medium and configured to operate reliably in average soil at a depth of about of twenty-four to thirty-six inches. In various embodiments, the spiral geometry is also optimized to lower impedance.

In various embodiments, matching impedance between antenna 130 and tag chip 120 at an operating frequency (e.g., ultrahigh frequency, 860 to 960 MHz) helps optimize efficiency. Soil in close proximately to the tag or tag surface changes the antenna input impedance but, in various embodiments, it may be compensated for using a customized network.

Referring again to FIG. 3, in various embodiments, reflector 150 is made of a metal (e.g., aluminum). In various embodiments, reflector 150 is made of one or more metals, or combination of metals. However, the reflector may also be implemented with foil, sheet metal, or PCB. In various embodiments, the marker includes a rear metal (e.g., steel) plate and may include an attachment point for customer specified fixtures or equipment.

In various embodiments, reflector 150 is sized larger than tag 110. For example, as illustrated in FIG. 3, the reflector diameter, width and/or area is greater than the comparable dimension of the tag. In various embodiments, reflector 150 and its position and/or orientation relative to tag 110 serves up to several purposes. For example, reflector 150 may reflect energy radiated from the back of the antenna back toward the antenna (or in the direction of the surface of the Earth such as when the mark is underground). In addition, the larger reflector dimension or diameter (e.g., relative to the tag) helps cause the electromagnetic pattern emitted from the tag to be focused more tightly in a forward direction normal to the spiral surface.

In various embodiments, a spacing $S_1$ between reflector 150 and tag 110 (and antenna) is optimized to help insure that the reflected wave reinforces the electromagnetic wave emitted from the forward side of the spiral, to help increase forward gain. In various examples of embodiments, spacing $S_1$ is in a range of approximately two inches to three and one half inches. In various embodiments, spacing $S_1$ ranges from about two and one-half inches to three inches. In various embodiments, spacing $S_1$ is approximately two and three-quarters inches (or seventy millimeters).

Figure 5:
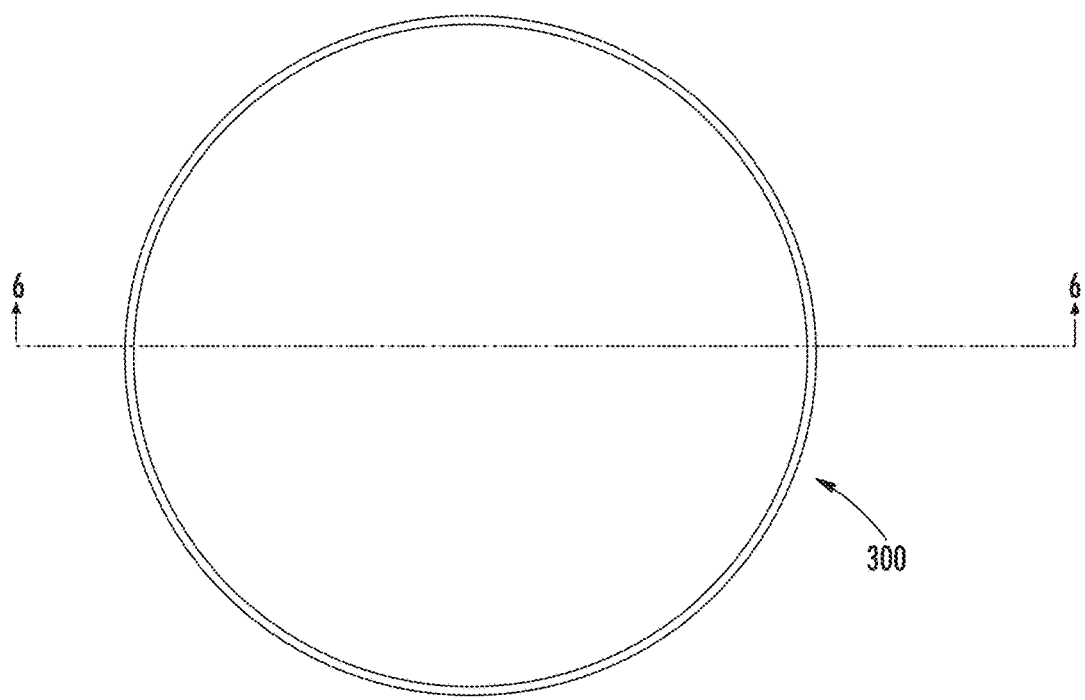
FIG. 5 illustrates a top view of a second embodiment of a marker, according to various examples of embodiments.

Referring now to FIGS. 5-8, a second embodiment of a marker 300 is illustrated. In various embodiments, marker 300 includes a reflector 350 spaced from an RFID tag 310 in a housing 370. In various embodiments, RFID tag 310 includes a dual spiral, circularly polarized antenna that operates at a high or ultra-high frequency (e.g., a frequency in the range of 890 MHz and 940 MHz and, more particularly, of approximately 915 MHz). In various embodiments, marker 300 shown in FIGS. 4-5 is about one and one-half inches tall (with tag 310 spaced about one inch over, above or from reflector 350 (e.g., to help increase forward gain)) and impedance matched for air. In various embodiments, marker 300 in FIGS. 4-5 is configured to operate reliably in average soil at a depth of less than about twenty-four inches. In various embodiments, marker 300 includes a magnet 360. In various embodiments, magnet 360 is provided in spacing between tag 310 and reflector 350.

In various embodiments, chip 320 of RFID tag 310 is a high sensitivity chip having a sensitivity range from negative eighteen dBm to negative twenty dBm. In various embodiments, tag 310 includes a Higgs 3 RFID chip. It should be appreciated, however, that other chips (such as a Impinj Monza R4 RFID chip, a RFMicron Magnus-S2 chip, a Quanray Qstar-2A chip, a Impinj Monza 4 chip, or a Impinj Monza R6 chip) may also be utilized. While the tags described in more detail herein include or incorporate passive RFID chips, it should be appreciated that active chips and sensor chips may also be incorporated, included or utilized.

In various embodiments, antenna 330 of RFID tag 310 is a dual spiral antenna. In various embodiments, antenna 330 is a four-inch to six-inch diameter dual spiral antenna. In various embodiments, antenna 330 is formed of a layer of conductive material deposited in a dual spiral pattern on printed circuit board 340. The antenna could also be formed from a wire shaped into a spiral pattern and coupled to the printed circuit board. The antenna may be implemented on FR-4 (or FR-1 or FR-2, e.g., for cost reduction) material. In various embodiments, tag 310 is approximately five inches in diameter. In various embodiments, antenna 330 is a four and three-quarter inch diameter dual spiral antenna. In various embodiments, antenna 430 is circularly polarized. In various embodiments, antenna 430 is right hand circularly polarized. In various examples of embodiments, antenna 430 is right hand circularly polarized to match a right hand polarization of a reader antenna. In such embodiments, the matching polarization of the tag and reader antenna help give the reader and tag system up to about a three dB gain or increase over systems without matching polarization.

In various embodiments, reflector 350 is made of a metal (e.g., aluminum). In various embodiments, reflector 350 is made of one or more metals, or combination of metals. However, the reflector may also be implemented with foil, sheet metal, or PCB. In various embodiments, the marker includes a rear metal (e.g., steel) plate and may include an attachment point for customer specified fixtures or equipment.

Figure 6:
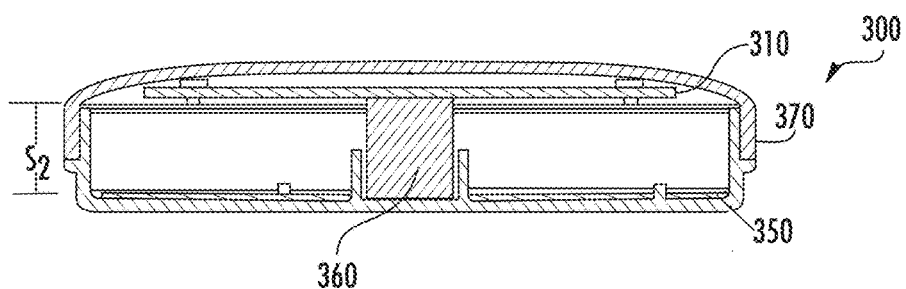
FIG. 6 illustrates a partial cross sectional view of the marker of FIG. 5.
Figure 7:
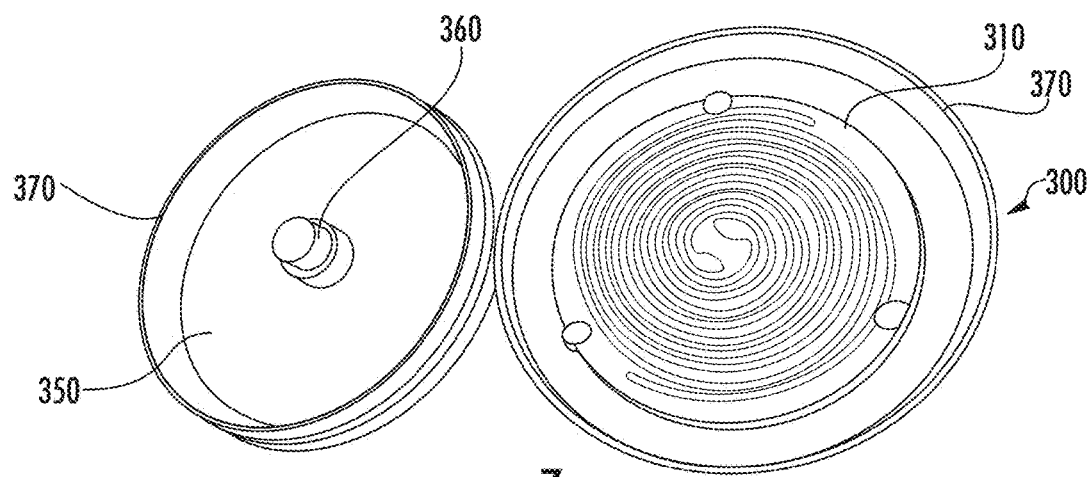
FIG. 7 illustrates a perspective view of the marker of FIG. 5 partially disassembled to show a lower portion of a housing with a reflector and magnet and an upper portion of the housing with RFID tag.
Figure 8:
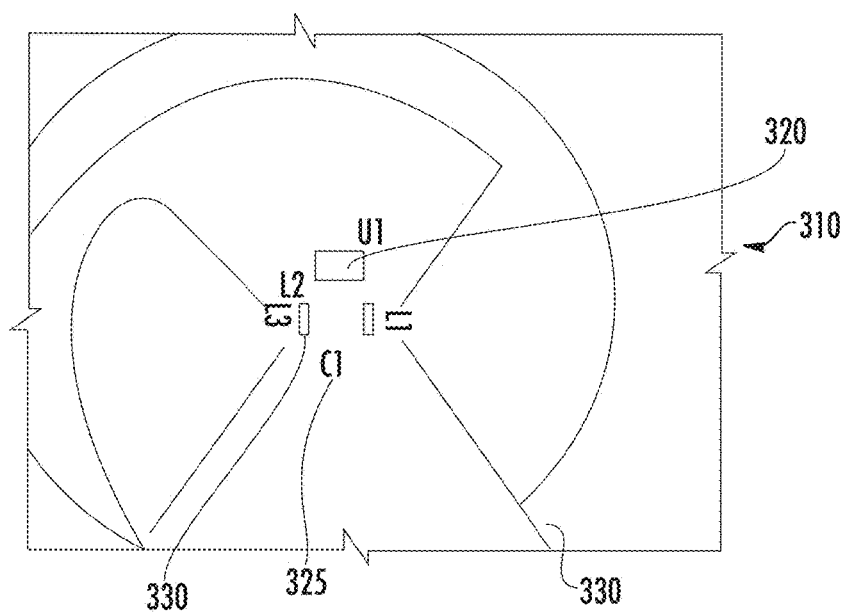
FIG. 8 illustrates a partial plan view of a dual spiral, circularly polarized RFID tag, according to various examples of embodiments.

In various embodiments, reflector 350 is sized larger than tag 310. For example, as illustrated in FIG. 6-7, the reflector diameter, width and/or area is greater than the comparable dimension of the tag. In various embodiments, reflector 350 and its position and/or orientation relative to tag 310 serves up to several purposes. For example, reflector 350 may reflect energy radiated from the back of the antenna back toward the antenna (or in the direction of the surface of the Earth such as when the mark is underground). In addition, the larger reflector dimension or diameter (e.g., relative to the tag) helps cause the electromagnetic pattern emitted from the tag to be focused more tightly in a forward direction normal to the spiral surface.

In various embodiments, a spacing $S_2$ between reflector 350 and tag 310 (and antenna 330) is optimized to help insure that the reflected wave reinforces the electromagnetic wave emitted from the forward side of the spiral, to help increase forward gain. In various examples of embodiments, spacing $S_2$ is in a range of approximately one-half inch to one and one half inches. In various embodiments, spacing $S_2$ ranges from about three-quarter inch to one and one-quarter inches. In various embodiments, spacing $S_2$ is approximately one inch.

The invention is further illustrated in the following Example which is presented for purposes of illustration and not of limitation.

EXAMPLE 1

Figure 9:
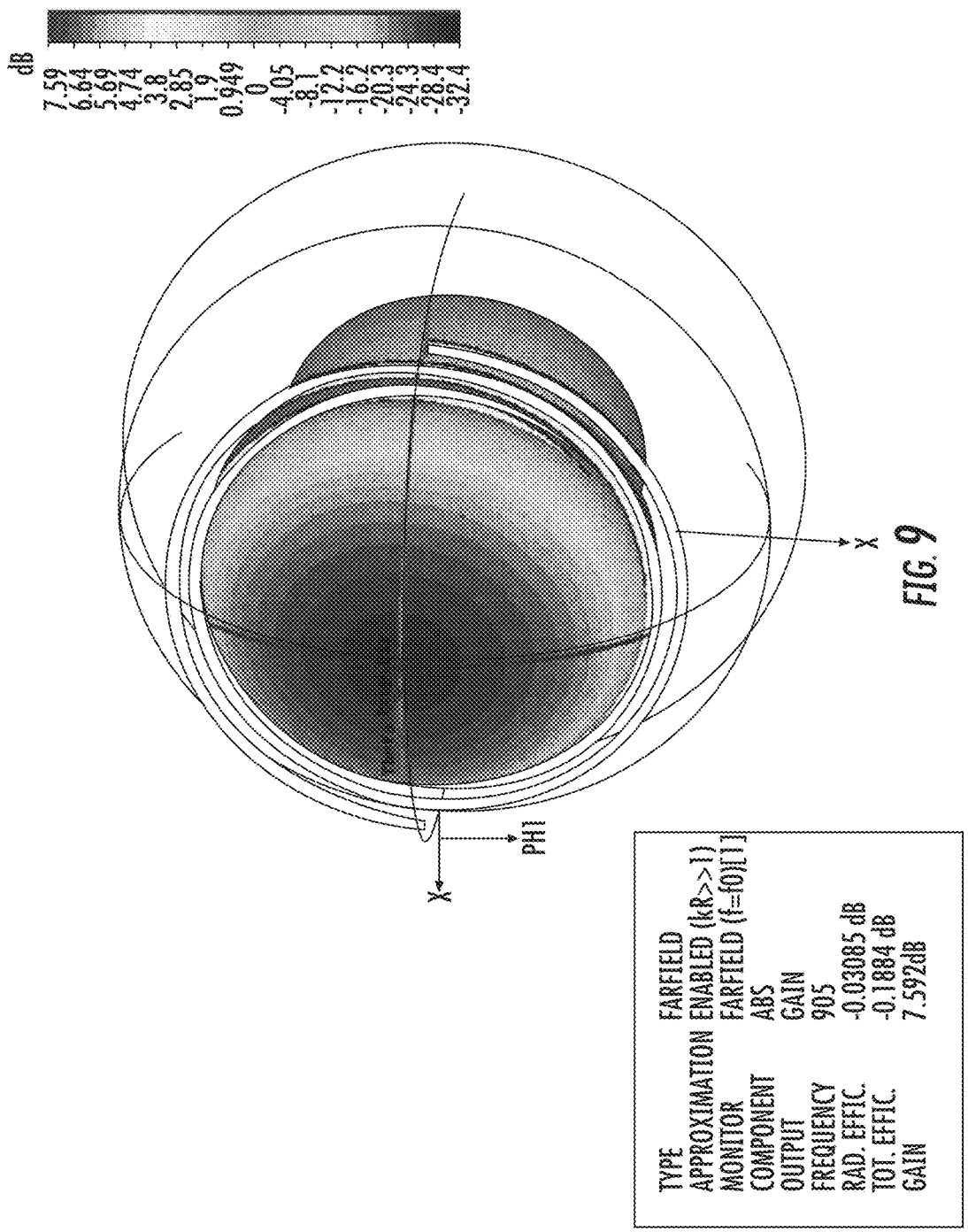
FIG. 9 is a graph illustrating a simulated pattern of an RFID tag having a dual spiral antenna, according to various examples of embodiments.
Figure 10:
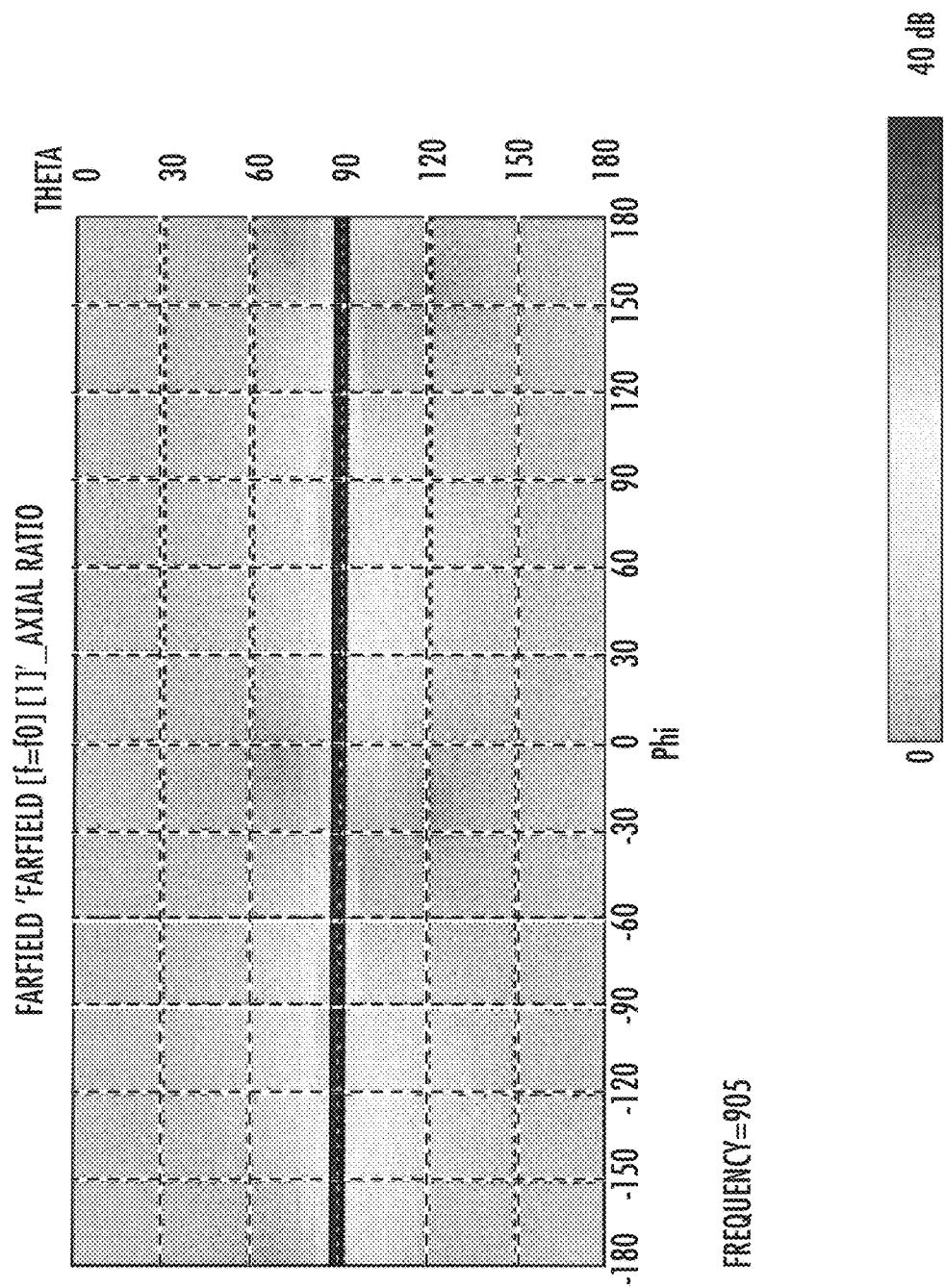
FIG. 10 is graph illustrating a two dimensional simulated radiation pattern of an RFID tag having a dual spiral antenna, according to various examples of embodiments.

Simulations of a marker according to various embodiments were conducted. The tag included a reflector backed spiral antenna with a dual arm/differential spiral ~4.75" in diameter and a reflector (~6" diameter) provided ~2.75" from or behind the spiral. In various embodiments, the spiral antenna had a Zo of 188Ω, which was relatively high compared to the tag integrated circuit. The tag also did not include a plastic housing. Referring now to FIGS. 9-10, the gain was ~7.6 dBi with good free space efficiency and the axial ratio was low for good circularly polarized performance, despite relatively high Zo compared to the chip and less than optimally matched impedance.

Figure 12:
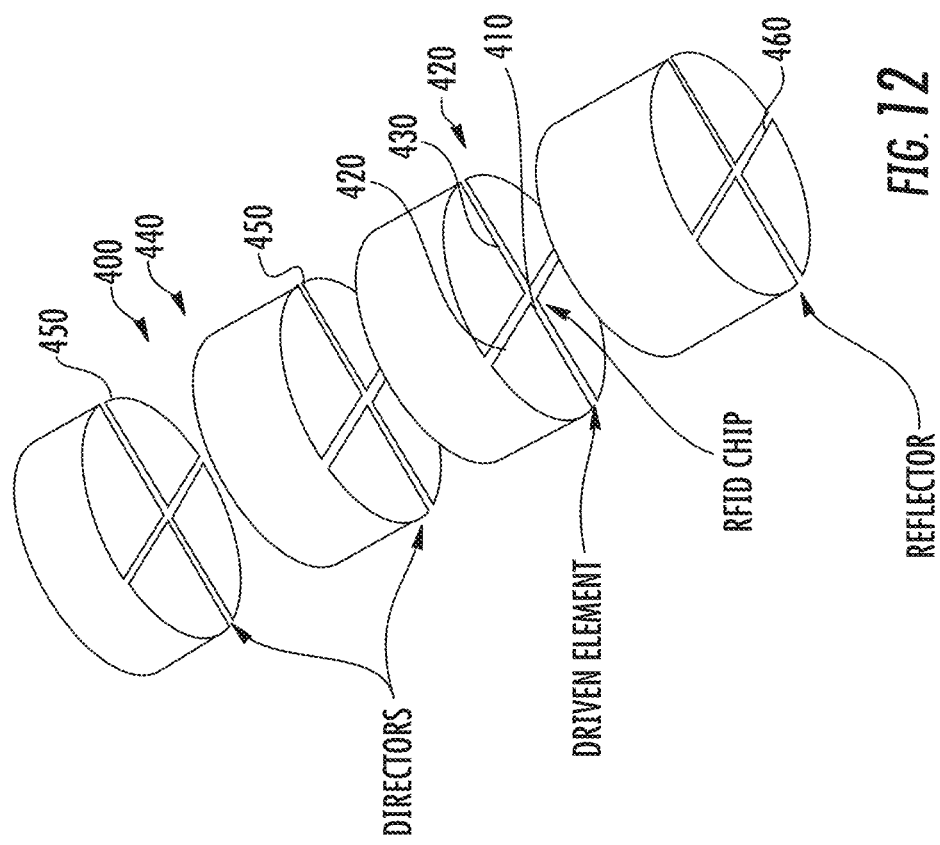
FIG. 12 is an exploded isometric view of an example RFID tag including a crossed-element Yagi antenna, according to various examples of embodiments.
Figure 11:
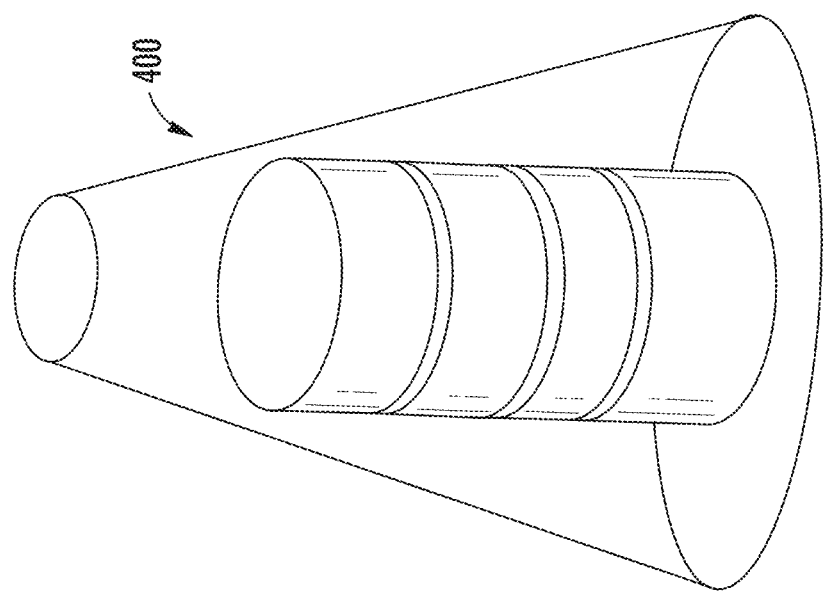
FIG. 11 is an isometric view of an example RFID tag including a crossed-element Yagi antenna, according to various examples of embodiments.

Referring now to FIGS. 11 and 12, a third exemplary embodiment of an RFID marker 400 is illustrated. Referring more specifically, in various embodiments, RFID marker 400 includes an RFID tag 410. In various embodiments, RFID tag 410 includes a crossed driven elements 420 and an RFID chip 430.

In various embodiments, RFID tag 410 includes a cross-element Yagi antenna 440. In various embodiments, antenna 440 includes two orthogonal Yagi arrays or directors 450 (e.g., that are driven out of phase). In various embodiments, antenna 440 operates at a high or ultrahigh frequency (e.g., a frequency in the range of 890 MHz and 940 MHz and, more particularly of approximately 915 MHz). According to various embodiments, a reflector 460 is provided behind driven elements 420. According to various embodiments, directors 450 are placed in front of driven element 420.

In various embodiments, the RFID tag includes four dual six-inch element, crossed Yagi antennas. However, the RFID tag may include more (e.g., five) dual element, crossed Yagi antennas.

In various embodiments, a lossless combiner/phase shifter may be provided between Yagi antenna directors 450 (e.g., in the form of an inductor/capacitor network). For example, the input impedance of antenna 440 may be lowered, so ~15-25Ω is achievable which could make matching a reader to chip 430 more manageable.

In various embodiments, a standard Yagi in free space with elements that are approximately six inches long and approximately two inches apart may be used. However, the dimensions could be reduced by plastic loading.

For example, in various embodiments, one or more directors 450, driven element 420, and reflector 460 may be provided on and spaced apart by material. For example, it may be relatively easy and cost effective to manufacture the elements on double-sided RF4 material. FR-1/2 material may also be a cost effective material on which to provide driven elements 420, directors 450, and reflector 460.

The elements disclosed could be reduced in size, for example, by use of materials with higher dielectric constants. For example, the FREQTIS® brand material available from Polyplastics, being a low loss material, with ∈r=4.5-20 may be utilized. As another example, an injection moldable plastic (e.g., with ∈r>5) may also be utilized.

In various embodiments, RFID tag 410 is approximately six inches in diameter, eleven inches in length and provides circular polarization. In various embodiments, RFID tag 410 provides about 10 dB gain and is relatively immune (or not prone) to detuning due to the proximity of soil. In various embodiments, tag 410 is housed in an approximately six inch diameter by twelve inch tall cylinder housing (e.g., of commercial PVC pipe). In various embodiments, the marker has a rear steel plate may include an attachment point for customer specified fixtures. In various embodiments, the tag is configured to operate reliably in average soil up to forty-eight inches deep.

The invention is further illustrated in the following Example which is presented for purposes of illustration and not of limitation.

EXAMPLE 2

Figure 13:
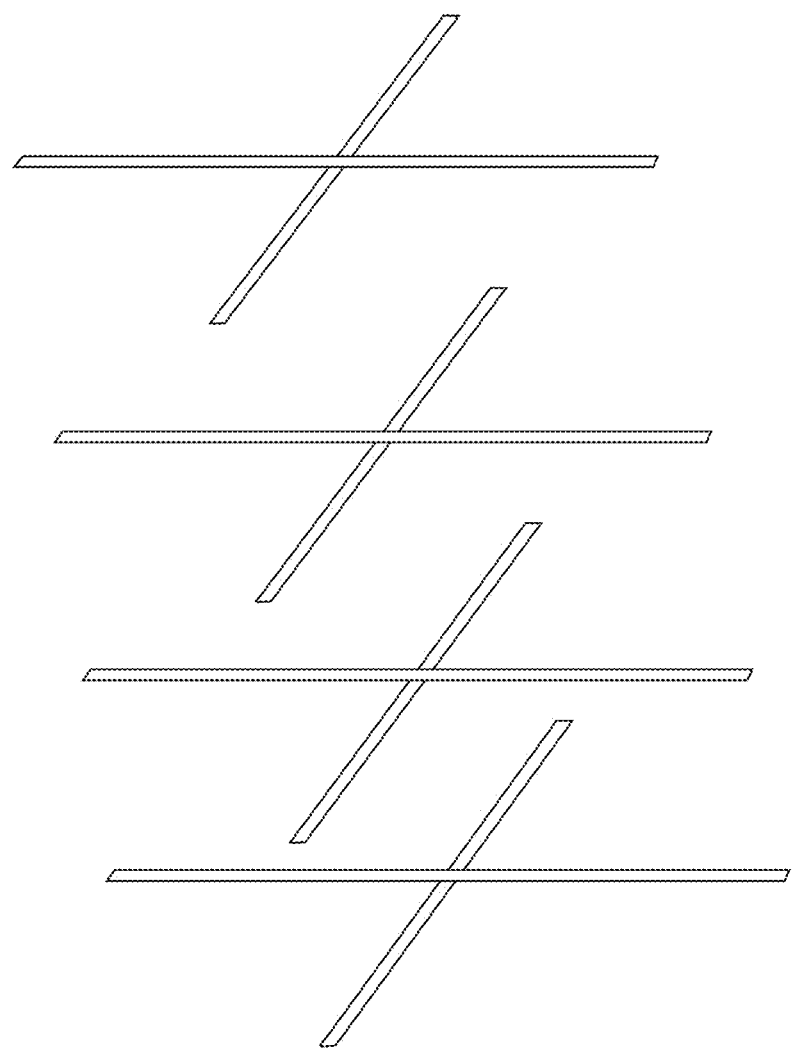
FIG. 13 is a schematic view of an example crossed-element Yagi antenna configuration, according to various examples of embodiments.
Figure 14:
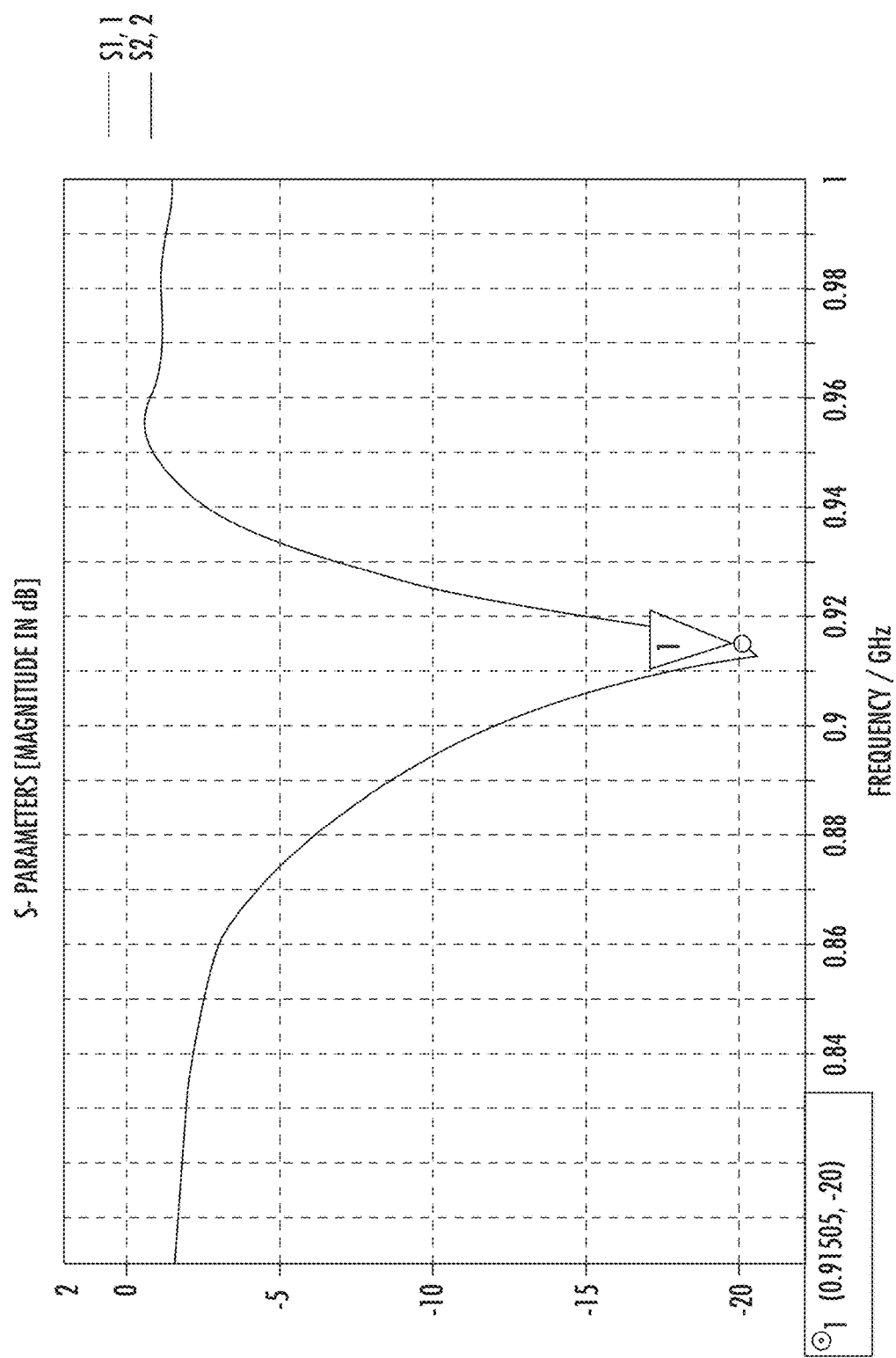
FIG. 14 is a graph illustrating a plot of simulated S-parameters (S11 and S22) of an example RFID tag including a crossed-element Yagi antenna, according to various examples of embodiments.
Figure 15:
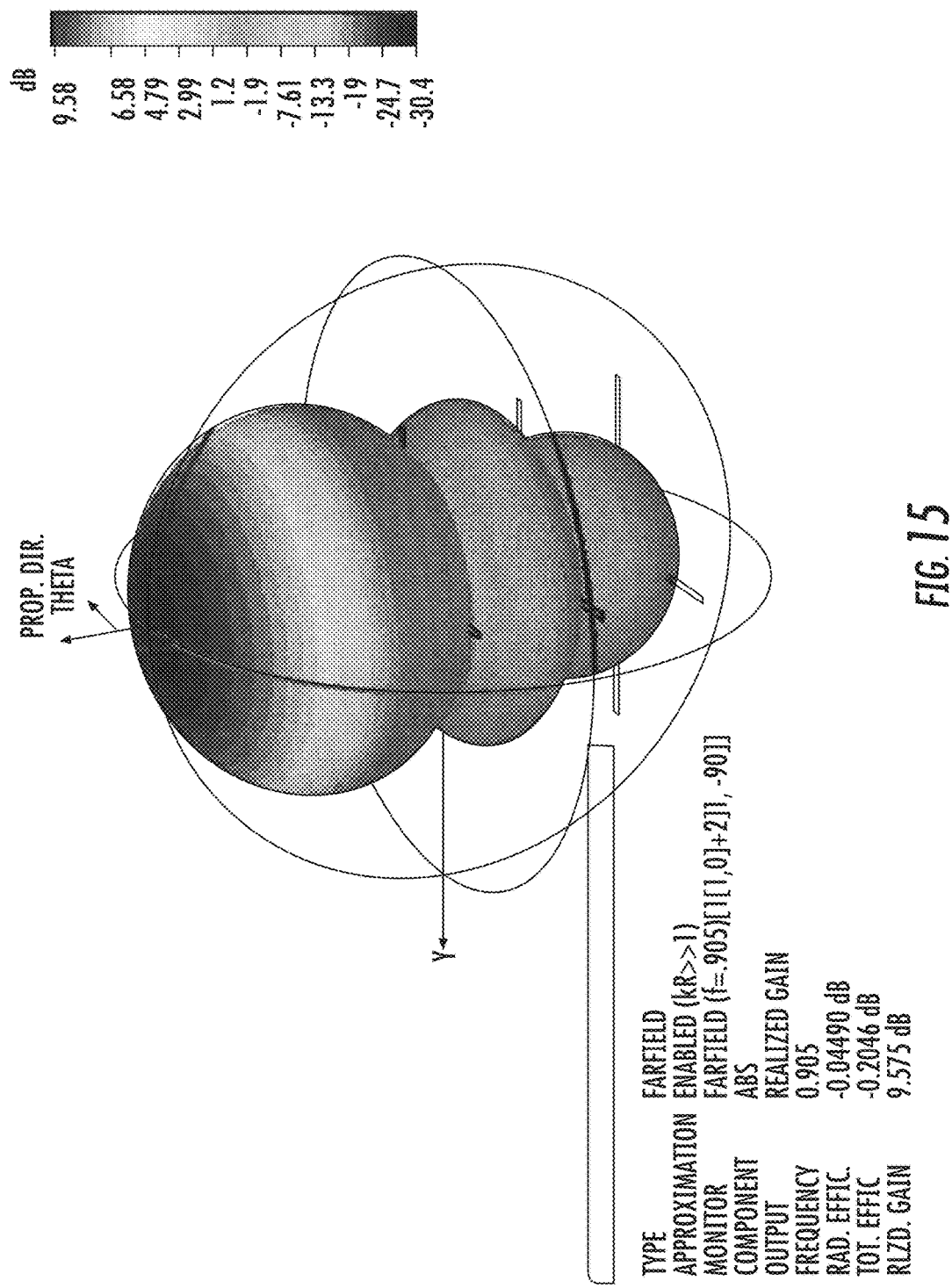
FIG. 15 is a graph illustrating a simulated pattern of an RFID tag having a crossed-element Yagi antenna, according to various examples of embodiments.
Figure 16:
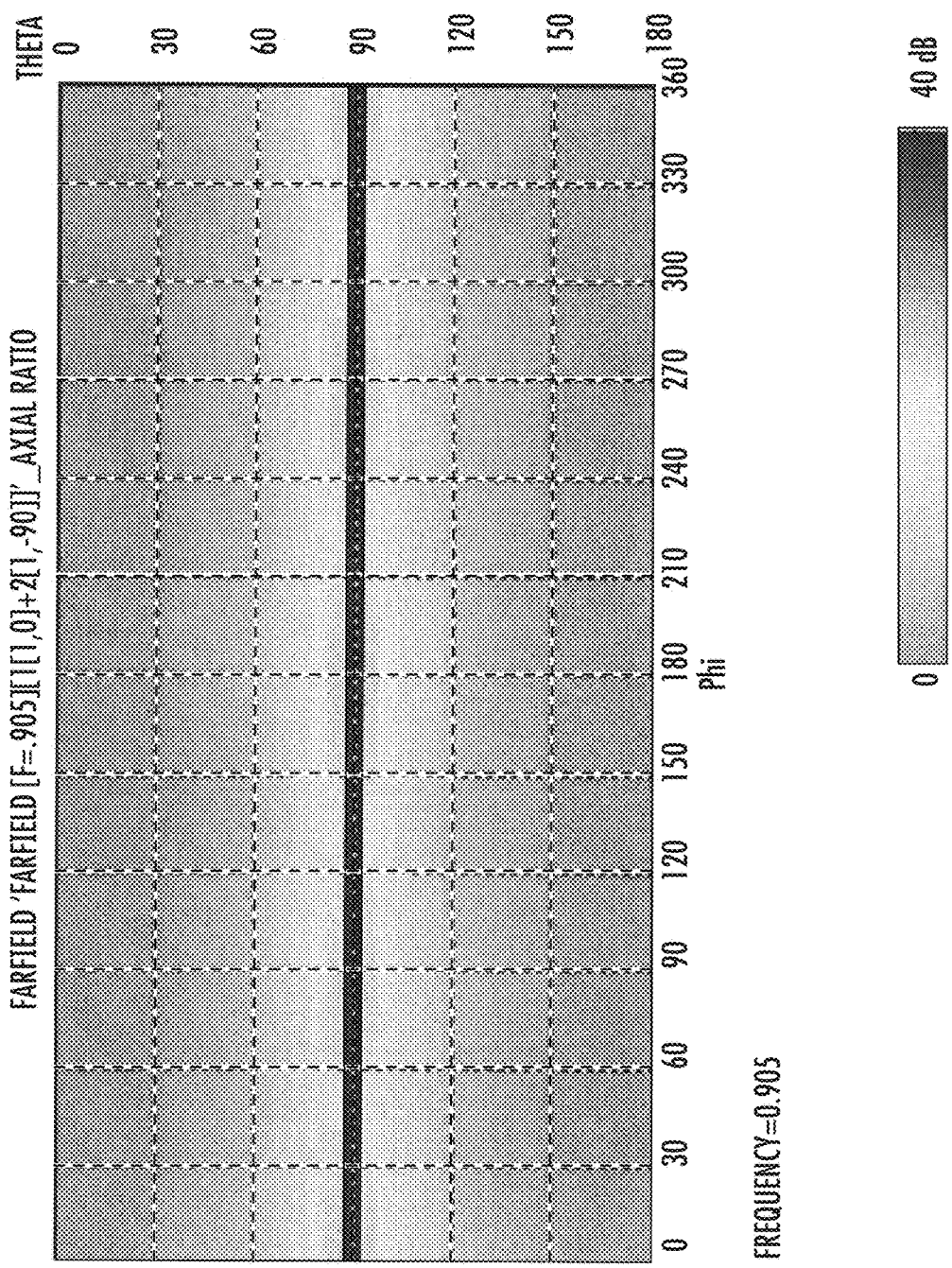
FIG. 16 is graph illustrating a two dimensional simulated radiation pattern of an RFID tag having a crossed-element Yagi antenna, according to various examples of embodiments.

A dual Yagi antenna as illustrated in FIG. 13 was modeled with no dielectric or plastics. The antenna measured ~6.25" (159 mm) across and ~6.7" (170 mm) high, with reflector 460 the longest in length and lengths tapering slightly to second director 450 at ~5.7" (144.8). Referring now to FIGS. 14-16, in testing, the four element configuration shown in FIG. 13 produced ~9.6 dBi of gain and a bandwidth of about 3.3-3.8%. As can be seen from FIG. 15, the circular polarization performance of the antenna in FIG. 13 during testing was good.

In various embodiments, additional elements (such as a fifth element or more) may be added. For example, adding another element may take the gain to ~11 dBi while adding ~2.8" (72 mm) to the overall length. In various embodiments, the second embodiment or "Yagi" antenna may be further optimized to cover the 900 MHz band with some margin, and possibly the 800 and 900 MHz bands.

In various embodiments, the antenna may be a loop Yagi. In various embodiments, the loop Yagi includes a ~4.5" driven ring and smaller rings for the reflector (~4.3")/directors (~2.9") that would be ~1.3" apart.

Figure 17:
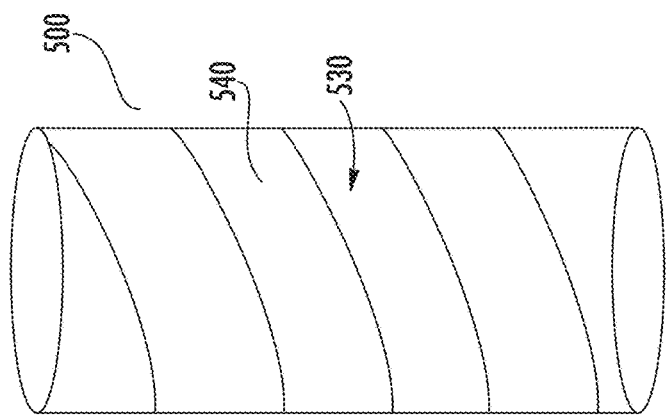
FIG. 17 illustrates a perspective view of an RFID tag having a backfire helix antenna, according to various examples of embodiments.

A fourth exemplary embodiment of an RFID tag may also be utilized. Referring to FIG. 17, in various embodiments, the fourth exemplary embodiment of an RFID tag is a post tag 500, which includes a backfire helix antenna 530 wrapped around a robust dielectric post 540 which can be driven into the soil. In various embodiments, post tag 500 is approximately 2.4 inches in diameter and approximately 7.3 inches in length. In various embodiments, post tag 500 (or antenna 530) is circularly polarized, provides about 6 dB gain, and is relatively immune (or not prone) to detuning due to the proximity of soil. In various embodiments, post tag antenna 530 operates at a high frequency (e.g., a frequency in the range of 890 MHz and 940 MHz and, more particularly of approximately 915 MHz).

Figure 18:
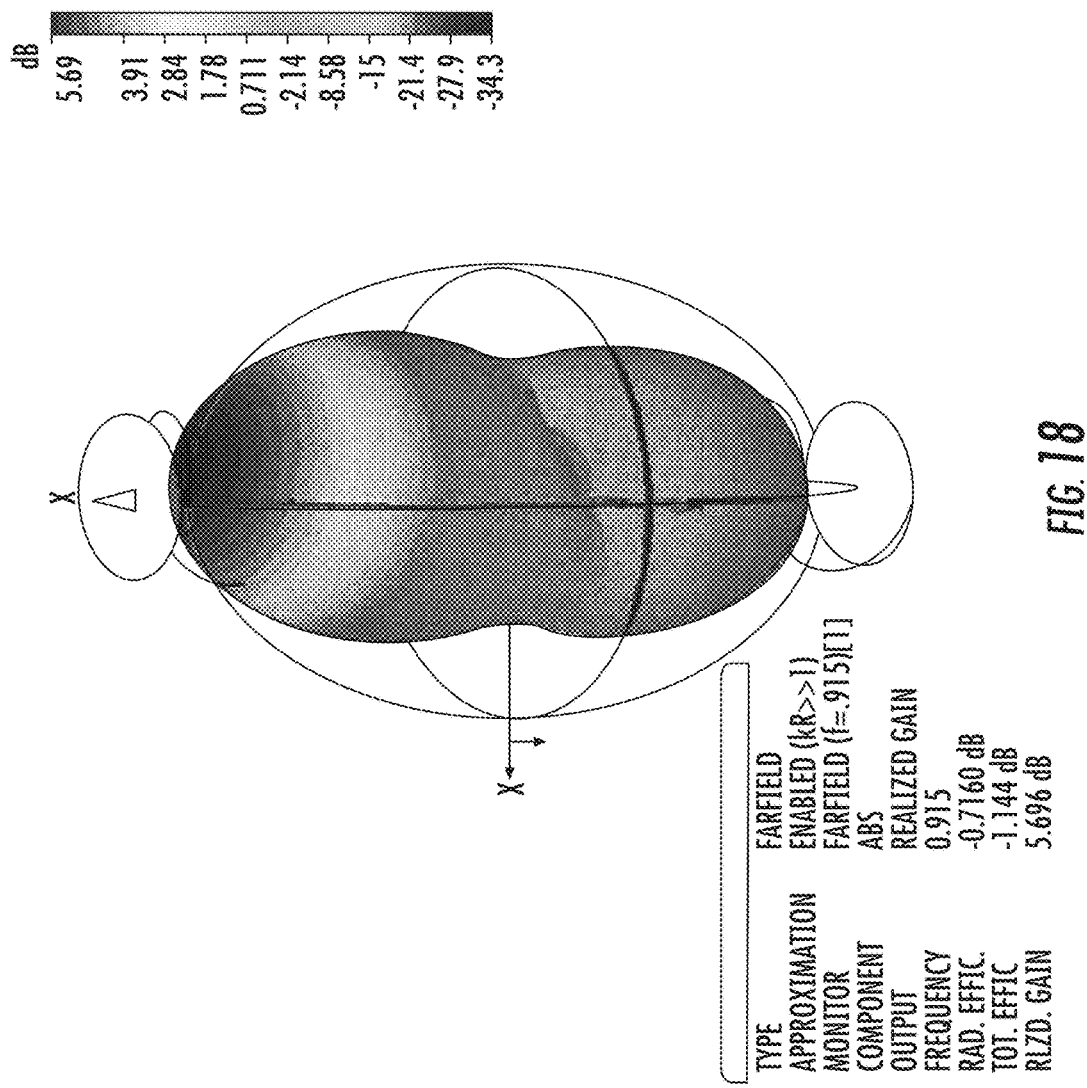
FIG. 18 is a graph illustrating a simulated pattern of an RFID tag having a backfire helix antenna, according to various examples of embodiments.

In various embodiments, post tag 500 is configured for reliable reading from the surface to twenty-four inch depths. As can be seen from FIG. 18, the circular polarization performance of antenna 530 during testing was good.

In various embodiments, the RFID tag antenna of the various disclosed embodiments is circularly polarized. This polarization works well in tracking and locating below ground or hidden assets and tags as the orientation of such tags is typically unknown and/or may change over time. In various embodiments, the tag antenna is elliptically or circularly polarized to "match" the polarization of an RFID reader (e.g., right hand or left hand polarization) to provide advantages such as better performance.

Figure 19:
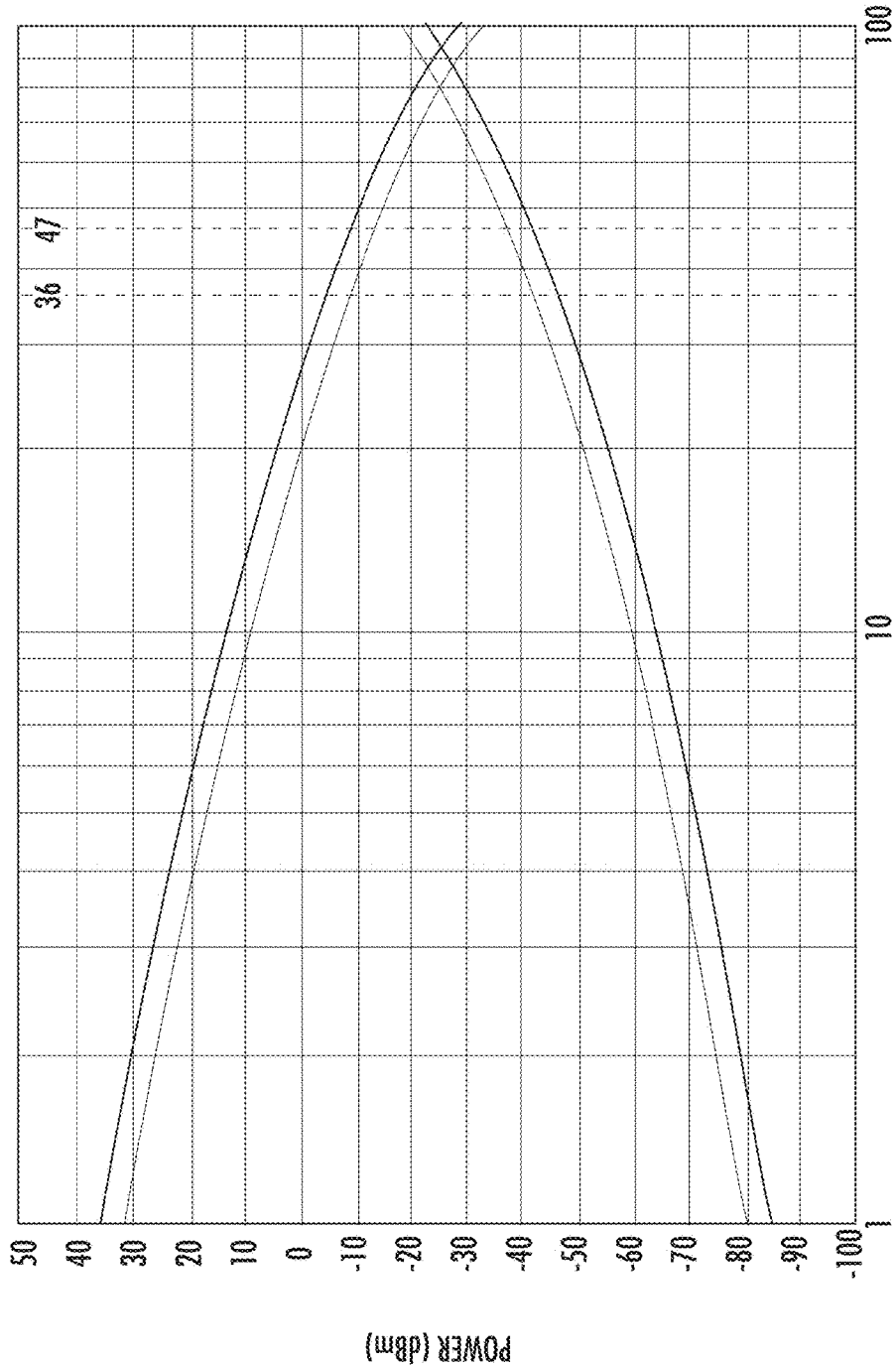
FIG. 19 is a graph illustrating read depth of the second embodiment of the marker and the read depth of a marker with a Yagi antenna, according to various examples of embodiments.

Referring now to FIG. 19, a vertical dotted line indicates an approximate thirty-six inch soil depth for the second embodiment of a marker and tag and an approximate forty-seven inch soil depth for the third embodiment of a marker tag disclosed herein. The simulation illustrated in FIG. 19 assumes relative soil permittivity of thirty and soil conductivity of six hundred twenty-five micro Siemens per centimeter.

While passive RFID tags are generally disclosed herein, it should also be appreciated that active or semi-active tags could also be utilized to improve impedance and sensitivity, and/or reduce any reverse link limitations of passive tags. The tags disclosed may contain information to locate and identify assets precisely and facilitate any required maintenance, repair or tracking.

In various embodiments, the RFID tag also includes sensors. Such sensors may include temperature sensors, leak detection sensors, chemical and gas sensors, movement sensors, moisture level sensors, etc. Sensor readings may be stored on the tag and communicated to a reader. Such readings can also be communicated to and stored in the cloud.

In various embodiments, the disclosed tags are included in a system that also includes a UHF RFID reader (e.g., a handheld UHF RFID reader). In various embodiments, the UHF RFID reader has a receiver sensitivity of roughly −78 dBm. It should be appreciated that any known of later-developed UHF RFID reader, having a different (e.g., greater, improved, or otherwise optimized) sensitivity may be utilized in the scope of this disclosure.

In operation, in various embodiments, read depth versus soil type is estimated or determined (e.g., using a comparison graph). The great variability of soil moisture content and mixture makes precise depth prediction untenable. The soils and materials are ordered based on their relative ability to support an electromagnetic field. They have low conductivity and low permittivity in the air and light sands; and high conductivity and high permittivity in the wet clay and water.

In some cases, tags may need to be placed some distance between the asset and the surface to improve the reliability of the reading of and writing to the tag. Then, in various embodiments, soil type selection and depth selection are used in association with FIG. 16 to determine tag selection.

In various embodiments, the tag can be installed closer to the surface to improve reliability. In addition, another tag with greater read depth may be selected and it is not necessary to locate them further from the surface.

In various embodiments, after the tags are selected they are placed. For example, depending upon the desired placement (e.g., a hole placement, a trench placement, or a roadbed placement), the tags may be provided below grade or another surface such as a road surface. Once placed, the tags may be located and the disclosed subsurface RFID system is designed to optimize the read depth through lossy soil. In various embodiments, the tag is located using one or more of the following stored references:
1. landmark proximately
2. photographs
3. property drawings
4. GPS location
5. magnetic location One or more of these references may be stored in the cloud.

In various embodiments, the approximate surface location above the UHF RFID is determined using a combination of existing surface marking, GPS coordinates, and/or magnetic location. The underground passive marker tag may be co-located with a permanent magnet. In various embodiments, after the general location of the tag is determined to within roughly one-half meter, an RFID reader using a high gain circularly polarized antenna is directed at the Earth's surface and a read is initiated. In various embodiments, to reach the tag the signal may first go through the air (e.g., eighteen inches of air) where it then strikes the soil. As the signal enters the soil there is likely some surface reflection loss. In various embodiments, the signal propagates down through the soil to the tag. The composition of soil may vary significantly greatly and the resulting attenuation of the signal may result in read depth uncertainty.

In various embodiments, the UHF RFID tag of the present disclosure could be utilized with GPS and magnetic locating for the identification of the underground infrastructure and site-specific assets. In various embodiments, the UHF RFID tag of the present disclosure may be provided in a system also comprising an above ground portable RFID reader/writer coupled with a magnetic locator that reads and writes subsurface tags. In various embodiments, the RFID reader has a Bluetooth data link incorporated that can be paired with any approved GPS enabled cellphone. For example, Applicant has developed a software application that collects the RFID data and passes it on to a cloud or the user-specified application as described in more detail in U.S. Pat. No. 9,235,823, the entirety of which is incorporated herein by reference.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. An apparatus for locating underground assets, the apparatus comprising:
a housing having a top and a bottom and providing a protected enclosure adapted for burial underground;
an ultra-high frequency (UHF) radio frequency identification (RFID) tag provided in the protected enclosure of the housing, the tag having a rear side facing the bottom of the housing and a front side facing the top of the housing, the tag having a chip and an antenna provided thereon; the UHF RFID tag operating to be interrogated by a UHF radio signal passing through overlying earth through the top of the housing to transmit UHF data from the radiofrequency identification tag outward through the top of the housing and the overlying earth;
an electrically conductive reflector provided in the protected enclosure of the housing between the rear side of the tag and the bottom of the housing and spaced from the antenna beneath the antenna adapted to concentrate energy received through a top of the housing on the antenna; and
a permanent magnet provided in the housing adapted to direct magnetic flux lines outward through the top of the housing for detection through the overlying earth.

2. The apparatus of claim 1, wherein the antenna has an antenna outside dimension and wherein the reflector has a reflector outside dimension greater than the antenna outside dimension.

3. The apparatus of claim 1, wherein the reflector is spaced from the antenna by least one inch.

4. The apparatus of claim 1, wherein the antenna operates at an ultra-high frequency in the range of 890 MHz to 940 MHz.

5. The apparatus of claim 4, wherein the antenna operates at an ultra-high frequency of about 915 MHz.

6. The apparatus of claim 4, wherein the chip and antenna are impedance matched at a frequency in the range of 890 MHz to 940 MHz.

7. The apparatus of claim 1 further including an impedance matching circuit adapted to match the impedance between the ultra-high frequency radio frequency identification tag chip and antenna for transmission through an average soil depth of 24 to 36 inches.

8. The apparatus of claim 1 wherein the housing is thermoplastic.

9. The apparatus of claim 1 wherein the reflector is a nonferrous metal.

10. The apparatus of claim 1 wherein the antenna is a dual spiral antenna.

11. The apparatus of claim 1 wherein the antenna is a Yagi spiral antenna.

12. The apparatus of claim 1 wherein the antenna is a backfire helix antenna.

* * * * *